S. A. OTIS.

Railway Track Scraper.

No. 9,445. Reissued Nov. 2, 1880.

WITNESSES

A. J. Oettinger.

F. F. McClintock.

INVENTOR

Samuel A. Otis by his Attys

Clarke & Raymond.

N. PETERS, PHOTO-LITHOGRAPHER, WASHINGTON, D. C.

UNITED STATES PATENT OFFICE.

SAMUEL A. OTIS, OF SOMERVILLE, MASSACHUSETTS.

RAILWAY-TRACK SCRAPER.

SPECIFICATION forming part of Reissued Letters Patent No. 9,445, dated November 2, 1880.

Original No. 78,537, dated June 2, 1868. Application for reissue filed January 23, 1880.

*To all whom it may concern:*

Be it known that I, SAMUEL A. OTIS, of Somerville, in the county of Suffolk and State of Massachusetts, have invented certain new and useful Improvements in Track-Scrapers; and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists, first, in arranging the two shoes of a scraper and the connecting parts in such a manner that the shoes may automatically adjust themselves to the varying gage of the track; second, in arranging the two shoes of a scraper and the connecting parts in such a manner that while the two shoes are adjusted to the track so as to lie across it diagonally, and thereby throw the snow and dirt to or toward the exterior of the track, the drawbars and braces which connect the said scrapers to the body of the car shall not only bring a draft upon them in the direction of the length, but shall also connect them diagonally with the central line of the car at a point forward of the scrapers; third, in providing braces extending from the said scraper to a point at about the center of the forward part of the car; fourth, in combination with the shoe, a small roller, which allows the shoe to run very nearly, but not quite, in contact with the rail; fifth, combining with the scraper a peculiar device, so arranged that the scraper may be raised from or lowered to the track by a lever, which may be operated by the foot or hand; sixth, in arranging the lifting device so that it may connect to the swinging frame to which the scrapers are attached at a point back of the pivot-line and at or near the transverse line of the scrapers.

Figure 1:
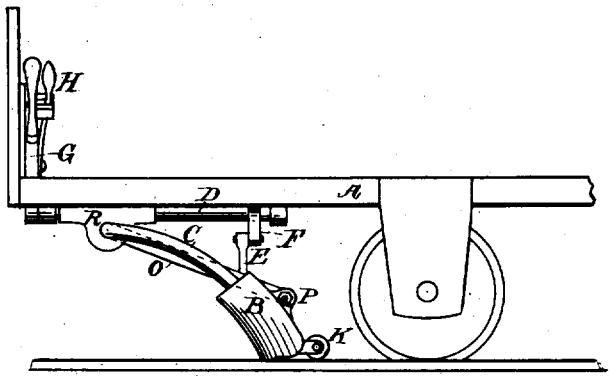
Figure 2:
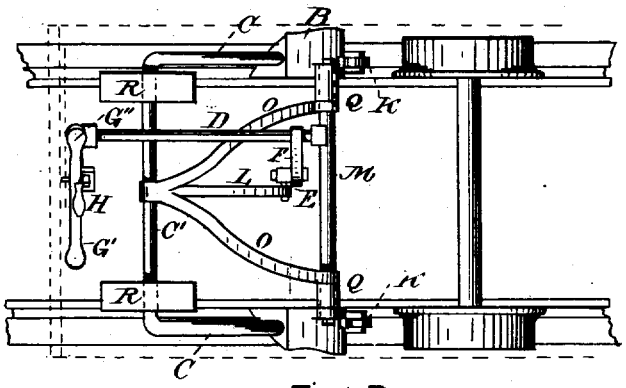
Figure 3:
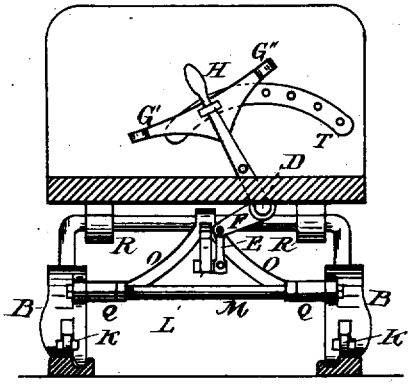
Figure 4:
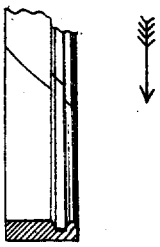

In the drawings, Figure 1 is a side elevation of a part of the car, showing my improved track-scraper attached. Fig. 2 is a plan of the same. Fig. 3 is an end elevation of the same. Fig. 4 is a plan of the track, showing, by diagonal lines, the manner in which the scraper lies across the track, the arrow representing the direction of movement of the car to which the scraper is attached.

B B represent the shoes or scrapers, shaped as shown in the drawings, and lying diagonally across the track, (see Fig. 4,) thus serving to throw the dirt to the exterior of the track. These scrapers, it will be observed, are provided with a tongue or lip, which fits upon the web of the rail, and serves to clean the depressed part as well as the tread of the rail.

M in Figs. 2 and 3 is a rod passing freely through the shoes, having a head or screw-nut upon each end, one of which is shown in Fig. 1 at P. Q Q are sleeves, sliding freely upon the rod M, one end of which bears against the shoe and the opposite end against the forked spring-brace O O.

By the above arrangement of the rod M and sleeves Q Q and the fork O O it will be seen that the shoes B B may be made to approach each other, and thus accommodate themselves to a narrow gage, the length of the rod M being such as to admit of the shoes B B fitting upon the widest gage likely to occur on ordinary roads. This forked yielding brace O O also serves to connect the scrapers with the central line of the car. The drawing-arms C C of the shoes are made flexible.

R R are housings, upon which the arms C C are hinged. L is a lever or rod, which is attached to the bar C′.

E is a link, attached to the rod L and to the arm F of the rock-shaft D, so that if said rock-shaft is operated, as it may be, by the lever G, the end of the rod L will be raised or lowered, and will thus raise the scrapers.

It is of importance that this point of attachment for the lifting apparatus should be placed on the line of the scrapers and pretty well back from the pivotal point of the housing R.

G′ $G^2$ are two arms extending from the lever G, which serve as levers to be acted upon by pressure of the feet. Thus, in Fig. 3, by pressing hard upon the arm $G^2$ it will be pushed over toward T, which action would raise the arm F, and through it the shoes B B. If the foot is placed upon the arm G′, Fig. 3, the shoes may be borne hard down upon the track.

T, Fig. 3, is a circular plate, having a number of perforations, as shown, into which a pin, (not shown in the drawings) attached to the handle H, may enter, and thus hold the lever G, and consequently the shoes B B, in any desired position.

What I claim, and desire to secure by Letters Patent, is—

1. The combination and arrangement of the shoes B B, sleeves Q Q, rod M, and forked brace O O, substantially as described, and for the purpose set forth.

2. The combination, with scrapers arranged to scrape a horse-car track in front of the wheels, of the draw-bars or arms C and the diagonal arms O, both connected with the scraping-blades B and pivoted upon the same line, as and for the purposes described.

3. The combination, with the lever G in a track-scraping machine, of the foot-lever G′ $G^2$, substantially as described, and for the purpose set forth.

4. The combination of a pivoted swinging frame containing longitudinal draw-bars and diagonal braces, and carrying at its rear end scrapers, with a lifting device operated from the platform of the car, and laying hold of said swinging frame at a point upon the line of said scrapers, substantially as and for the purpose described.

5. The combination of the lever L, the link E, and the rock-shaft D, substantially as described, and for the purpose set forth.

6. The combination of a swinging frame containing the draw-bars C and diagonal braces O, pivoted near the forward end of the car upon the same line with a scraper adapted to lie diagonally across the track, and with a lifting device adapted to raise said scraper and move said swinging frame upon its pivot by means of attachments which lay hold of said swinging frame upon the line of the scrapers, substantially as described.

SAMUEL A. OTIS.

Witnesses:
THOS. WIN CLARKE,
F. F. RAYMOND, 2d.